No. 641,027. Patented Jan. 9, 1900.
W. MARTIN.
MACHINE FOR CUTTING AND NOTCHING ROOFING PLATES.
(Application filed Sept. 13, 1899.)
(No Model.) 3 Sheets—Sheet 1.

Witnesses:
George Barry Jr.
Edward Vieser

Inventor
William Martin
By Brown & Seward
his Attorneys

No. 641,027. Patented Jan. 9, 1900.
W. MARTIN.
MACHINE FOR CUTTING AND NOTCHING ROOFING PLATES.
(Application filed Sept. 13, 1899.)
(No Model.) 3 Sheets—Sheet 2.

Witnesses:
George Barry Jr.
Edward Vieser

Inventor:
William Martin
By Brown & Seward
his Attorneys

No. 641,027. Patented Jan. 9, 1900.
W. MARTIN.
MACHINE FOR CUTTING AND NOTCHING ROOFING PLATES.
(Application filed Sept. 13, 1899.)
(No Model.) 3 Sheets—Sheet 3.
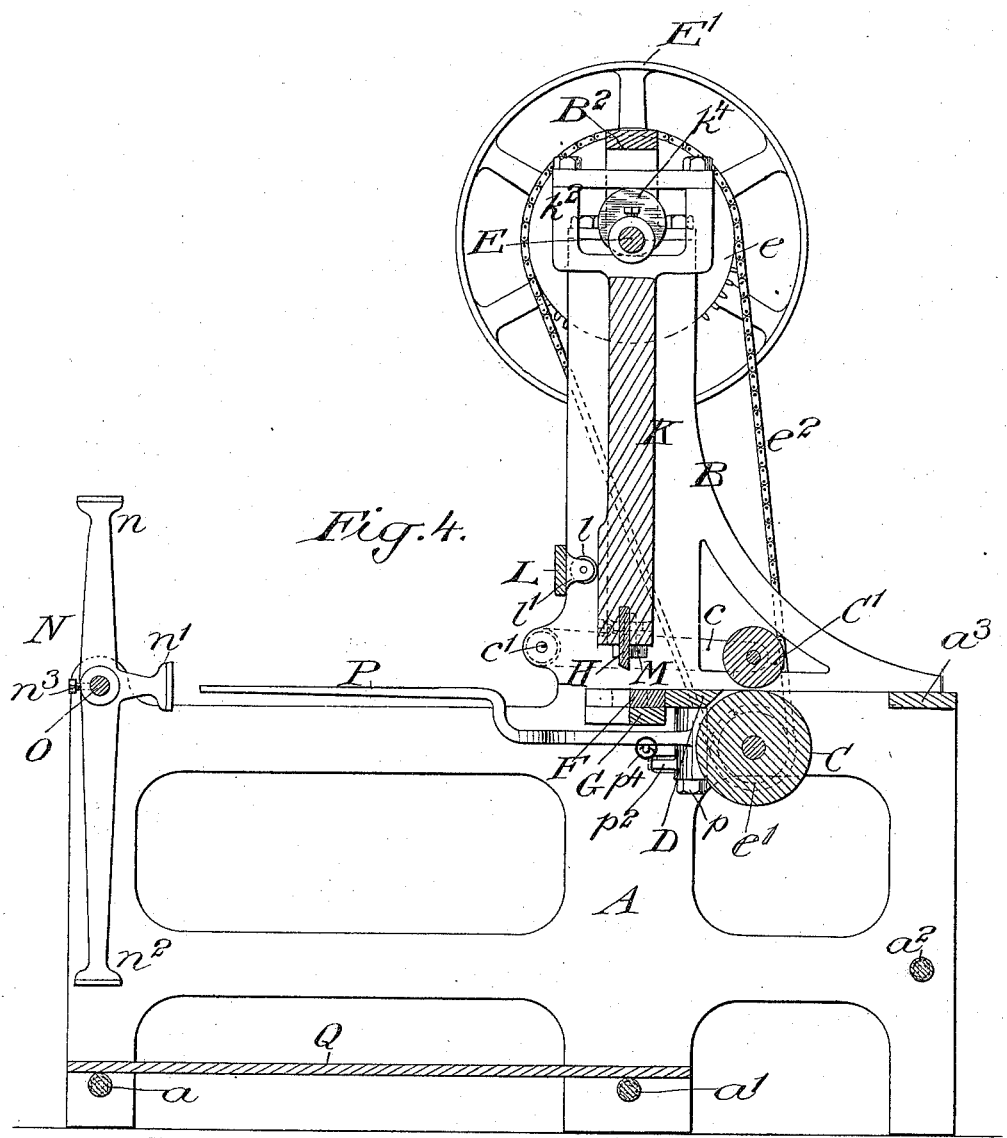
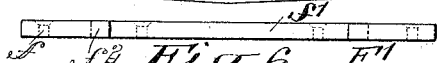
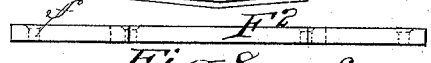
Witnesses:
George Barry Jr.
Edward Vieser
Inventor.
William Martin
By Brown & Seward
his Attorneys

UNITED STATES PATENT OFFICE.

WILLIAM MARTIN, OF NEW YORK, N. Y.

MACHINE FOR CUTTING AND NOTCHING ROOFING-PLATES.

SPECIFICATION forming part of Letters Patent No. 641,027, dated January 9, 1900.

Application filed September 13, 1899. Serial No. 730,300. (No model.)

*To all whom it may concern:*

Be it known that I, WILLIAM MARTIN, a citizen of the United States, and a resident of the borough of Manhattan, in the city and State of New York, have invented a new and useful Machine for Cutting and Notching Roofing-Plates, of which the following is a specification.

My invention relates to a machine for cutting and notching roofing-plates, with the object in view of accurately and expeditiously performing the work which has commonly been done in whole or in part by hand, and thereby rendering it feasible to notch the plates before they are submitted to the tinning process, thus securing a product which will be free from liability to rust, no matter how long it may be kept in stock or exposed to moisture during the laying of the roof.
A practical embodiment of my invention is represented in the accompanying drawings, in which—

Figure 1:
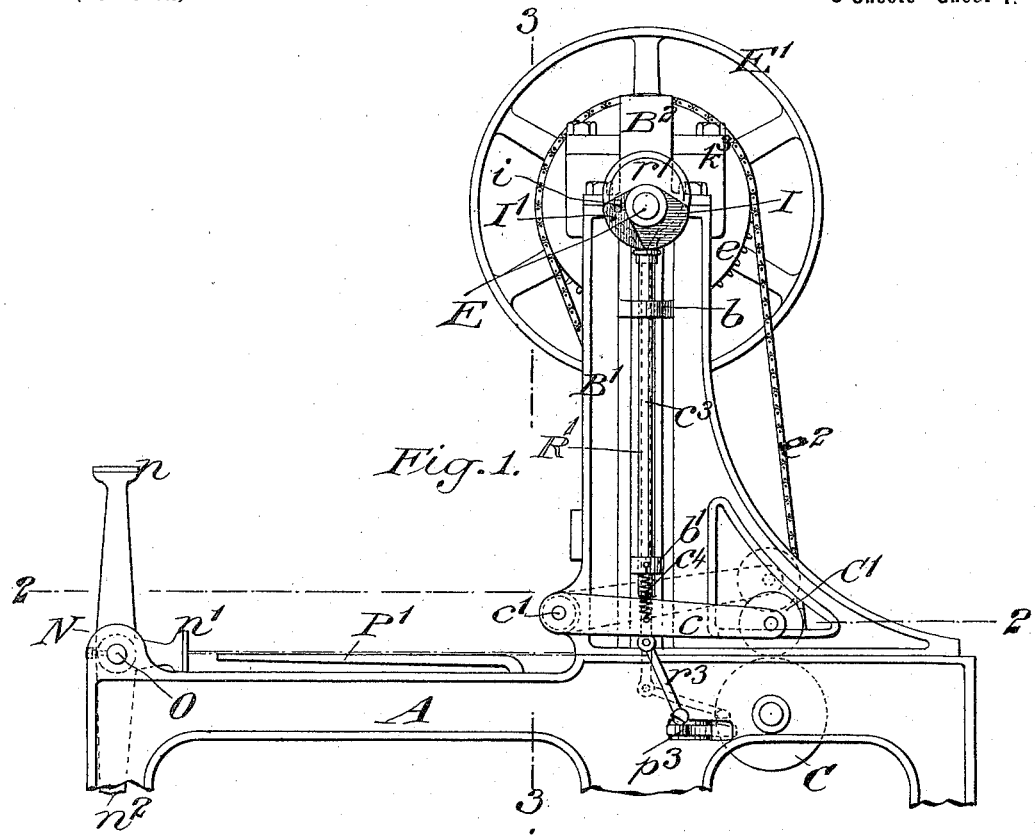
Figure 2:
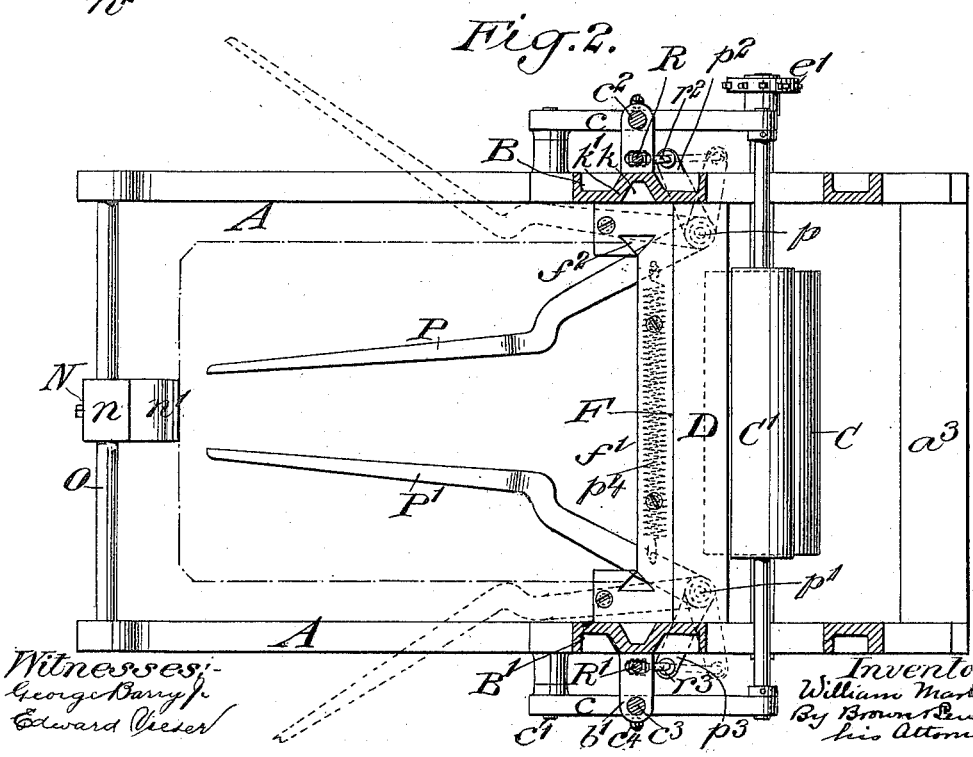
Figure 3:
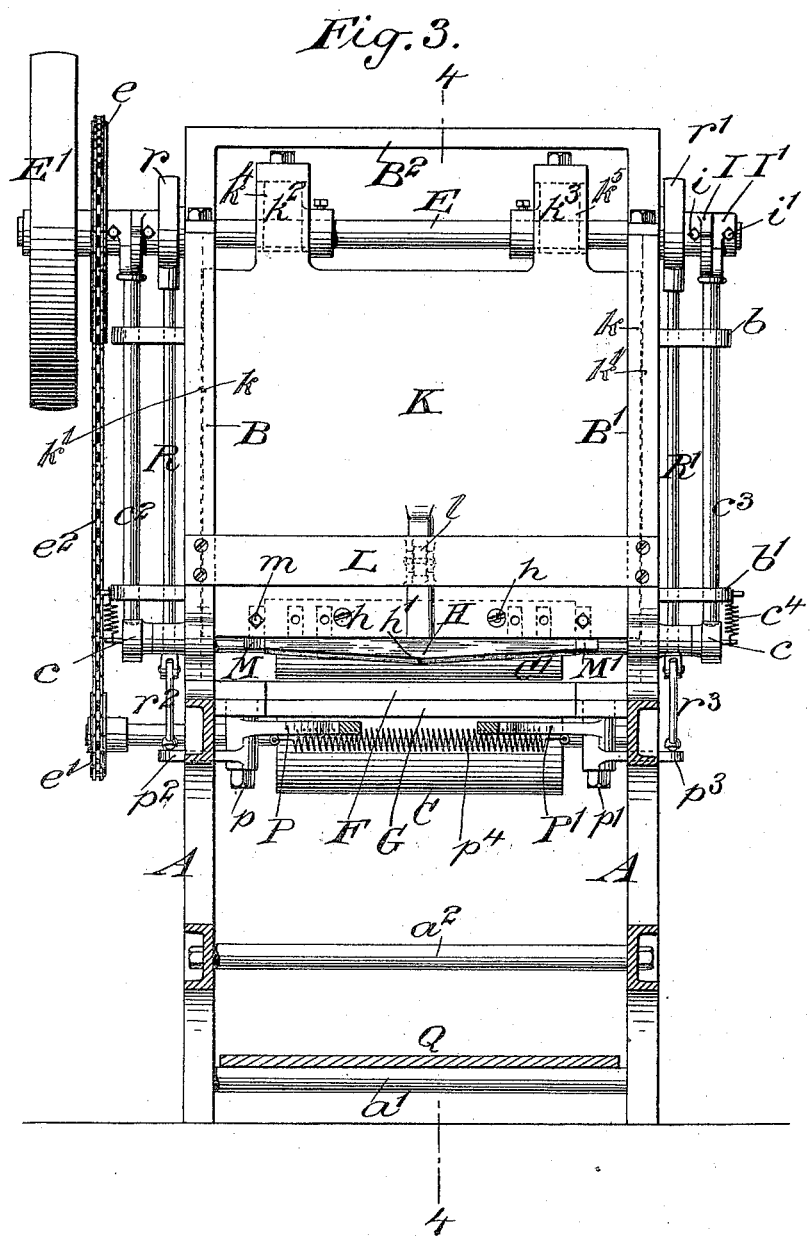

Figure 1 is a view of the machine in side elevation, the lower portion of the supporting-frame being omitted. Fig. 2 is a top plan view, partly in section, the section being taken in the plane of the line 2 2 of Fig. 1. Fig. 3 is a transverse vertical section taken in the plane of the line 3 3 of Fig. 1. Fig. 4 is a vertical longitudinal section taken in the plane of the line 4 4 of Fig. 3. Figs. 5 and 6 represent, respectively, a view of a cutter for the medium-sized sheet and an edge and top plan view of a die which coacts with the cutter;
and Figs. 7 and 8 represent similar views of a cutter and a die for producing the smallest of the three sizes of sheets.

The bed or supporting frame may be of any suitable shape or structure to accommodate the several operative parts. In the present instance it is composed of two skeleton side pieces denoted by A A, connected by tie-rods or girders $a$, $a'$, $a^2$, and $a^3$. The frame A is surmounted by a frame consisting of a pair of uprights B B', connected by a cross-head $B^2$ for carrying the cutter-operating shaft and the cutter and its support, as will be hereinafter more particularly described.

A feed-roller C is mounted in the bed-frame with its upper surface in the plane of the table D, over which the sheet of metal is fed to the dies and cutters, the said feed-roller C being positively and constantly driven by a sprocket-wheel $e$ on the drive-shaft E. The sprocket-wheel $e$ is connected with a sprocket-wheel $e'$ on the roller-shaft by a sprocket-chain $e^2$, and the drive-shaft E is mounted in the upper portion of the upper supporting-frame B B' and is provided with a drive-pulley E', through which the drive-shaft may be driven from a suitable source of power. (Not shown.)

Provision is made for securing the dies represented, respectively, by F, F', and $F^2$ in position with their upper surfaces in the plane of the table D by a transverse bed-piece G, to which the dies may be removably fastened by screws through the openings $f$ in the dies and into screw-holes tapped into the bed-piece G.

The several dies F F' $F^2$ have for convenience the screw-holes therein located the same distance apart in each, so that one set of screw-holes in the bed-piece G will serve to fasten the several different sizes of dies in position. Each of the dies is provided with a straight edge $f'$, which corresponds with the length of the knife for that particular size of chain and coacts with the knife-edge to sever the sheet with a shearing cut. At each of the opposite ends of the straight edge $f'$ of the die there is located a triangular-shaped opening $f^2$, with its apex at the extreme end of the line $f'$, the edges of the V-shaped opening $f^2$, which meet at the end of the straight edge $f'$, serving to coact with the corresponding edges of a V-shaped cutter to notch the adjacent ends of two consecutive sheets at the same time that the sheet is severed from the blank. The knives or cutters corresponding to the several different-sized dies are denoted by H, H', and $H^2$. In the present instance I have shown three of these sizes, which are intended to cut sheets of the three sizes in common use for roofing purposes.

To coact with the feed-roller C to feed the blank the proper distance for the length of a sheet is a presser-roller C', which is intermittently pressed toward the feed-roller C to grip the blank between them and force it along by means of cams on the drive-shaft E and mechanism intermediate of the cams and presser-rollers, as follows: The presser-roller is mounted in the free ends of a pair of swinging arms c, fulcrumed at c' on the frame and operated by a pair of vertically-reciprocating rods $c^2 c^3$, one at each side of the machine, mounted in brackets b b', projecting laterally from the sides B B' of the frame and resting on the arms c intermediate of their free ends and their pivotal connection with the frame. The rods $c^2 c^3$, and the arms c, on which they rest, are held normally lifted with the presser-roller C' out of contact with the blank by means of springs $c^4$, attached to the bracket b' at one end and at their opposite end to the arm.

The structure of the operating-rod and the arm which supports the presser-roller C' is quite similar at the opposite sides of the machine, and the particular description of one will serve as a description of the other. In like manner the cams for operating the rods $c^2 c^3$ are quite similar, and hence one only will be described. The cam is composed of two segments or sectors denoted by I I'. (See particularly Figs. 1 and 3.) The two sectors are located on the shaft E with their faces in proximity to each other, and each is arranged to be set in the desired rotary adjustment on the shaft by means of set-screws $i\ i'$. They have equal radii, so that their peripheries are at all times in the same cylindrical plane, and they may be opened out to form a combined circular periphery equal to one-third of a complete circle, more or less, as shown in Fig. 1, or they may be lapped past one another, so that their combined continuous peripheries will only be one-sixth of a complete circle, more or less. The top of the rod $c^2$ or $c^3$ is sufficiently broad to engage the periphery of both the sectors I I', and hence will be subject to the continued action of the peripheries of the two sectors, whether it be extended or contracted. This admits of holding the presser-roller C' depressed to feed the sheet for a greater or shorter length of time, as may be required for sheets of different lengths. For example, when the largest-sized sheet is to be cut the sectors may be opened out, as shown in Fig. 1, and will hold the presser-roller C' depressed long enough to feed a sheet of that length. Again, when a sheet of medium length is to be cut the sectors may be closed by lapping them past one another, so as to make the continued periphery of the two just long enough to feed a sheet of medium length, and in like manner they may be further closed to feed a sheet of the shortest length. When the peripheries of the sectors I I' are not engaged with the top of the rod $c^2$ or $c^3$, the latter will be permitted to lift under the upward pressure of the spring-actuated arms c, and the pressure-roller C' will be lifted out of engagement with the blank until the cams I I' again engage the operating-rod. During this interval, while the cams are out of engagement with the operating-rods, the cutting and notching of the sheets takes place as follows: The knife or cutter H is removably secured to the lower edge of a vertically-reciprocating stock K, which in the present instance is a thick plate of metal having its opposite edges k adapted to slide in grooves k' in the faces of the uprights B B', and provided at its top with a pair of yokes $k^2 k^3$ for the reception of eccentrics $k^4 k^5$, fixed on the shaft E. The stock K is further held firmly to its work by means of a guide-roller l, mounted in a bracket l', fixed on a cross-bar L, the said roller l being located about midway of the length of the knife-stock and near the lower edge of it, so as to effectively prevent the knife and its stock from creeping away from the straight edge of the die when the knife comes in contact with the metal blank. The knife or blade H is removably attached to the lower end of the stock K conveniently by means of screws h, and the several knives of different sizes have their screw-holes located some distance apart, so that one set of screws and screw-holes in the stock K will be sufficient for securing the several different sizes of knives or cutters in place. The knives are preferably provided with edges which gradually recede from the central portion h' toward the opposite ends of the knife for the purpose of producing a shearing cut. The knife-stock K is further provided with notching-cutters, one at each end of the knife, denoted by M M'. They are conveniently secured by means of bolts or screws m and the stock K is provided with sets of holes at different distances apart, so that the notching-cutters may be adjusted toward one another to positions in proximity to the opposite ends of the knives as the change of cutters for producing narrower or wider sheets is made.

To arrest the blank at the exact position which it should be cut, I provide a three-armed stop denoted as a whole by N, the three arms being denoted, respectively, by n, n', and $n^2$. The stop N is mounted on a cross-rod O at the rear end of the machine and may be adjusted in different positions by means of a set-screw $n^3$. For example, when the largest-sized sheet is to be cut the short arm n' will be in position, as shown in Fig. 4, to arrest the sheet. When the medium-sized sheet is to be cut, the stop N will be swung on the rod O to bring the arm n in position to arrest the blank, and when the smallest-sized blank is to be cut the stop N will be further swung into position to bring the longer arm $n^2$ in position to arrest the blank.

The sheets are supported while being cut and notched and promptly released as soon as the cutting and notching is completed by means of a pair of laterally-vibrating arms P P', which close into the position shown in full lines in Fig. 2 as the blank is fed forward into the position shown in dotted lines in said figure and which are suddenly forced apart into the position shown in dotted lines in said figure just as soon as the cutting is completed and the severed sheet is allowed to drop onto the pile of cut and notched sheets supported on the receiving-table Q. The supporting and releasing arms P P' are fulcrumed, respectively, at $p$ $p'$, and short arms $p^2$ $p^3$ extend from their hubs on the fulcrum points or spindles $p$ $p'$ laterally into position to receive motion from the vertically-reciprocating operating-rods R R', mounted in the brackets $b$ $b'$ on the outer faces of the uprights B B' and operated by cams $r$ $r'$ on the shaft E. The operating-rods R R' are connected at their lower ends with the free ends of the short arms $p^2$ $p^3$ by links $r^2$ $r^3$, which have a loose connection with the operating-rods R R' and a ball-and-socket connection of any well-known or approved form with the arms $p^2$ $p^3$. The arms P P' are drawn toward one another by means of a retracting spring $p^4$.

The operation of the machine may be briefly stated as follows: The proper knife or cutter and notching-cutters and die corresponding to the size of the sheet to be cut and notched having been placed in position, the blank is fed forward into the position shown in dotted lines in Fig. 2 until arrested by the arm of the stop N. At this moment the feed-operating cams I I' are thrown out of engagement with the rods which operate the pressure-roller C', and the eccentrics $k^4$ $k^5$ for operating the cutters force the cutters down into engagement with the blank, severing the sheet from the blank and notching the adjacent corners. As soon as the cutting and notching has taken place the cams $r$ $r'$ engage the operating-rods R R' and throw the supporting-arms P P' outwardly with a quick thrust, permitting the severed and notched sheet to drop onto the pile on the support Q. As soon as the sheet falls the cams $r$ $r'$ disengage the operating-rods R R', and the retracting spring $p^4$ promptly draws the supporting-arms P P' back into the position shown in full lines in Fig. 2, and the blank is again fed forward ready for the cutting and notching of a succeeding sheet.

I have shown the cutters, feed-operating cams, and cams for throwing the supporting-arms outwardly arranged in pairs. I find this arrangement preferable, because of the tendency to distribute the strains evenly throughout the width of the machine; but I have found that the machine will operate with more or less satisfaction when one cam is used instead of a pair for each of these operations, and hence I do not wish to limit myself strictly to a pair of cams in each instance.

It is obvious that other changes might be resorted to in the form and arrangement of the parts without departing from the spirit and scope of my invention. Hence I do not wish to limit myself strictly to the structure herein shown and described; but

What I claim is—

1. A machine for cutting and notching sheet-metal roofing-plates comprising a cutter for severing the sheet, notching-cutters each provided with cutting edges which diverge from the opposite ends of the single edge of the severing-cutter and arranged to act in conjunction with the severing-cutter and means for operating the cutters whereby a sheet of tin roofing with its several corners notched may be cut from a strip of material at each stroke of the combined severing and notching cutters, substantially as set forth.

2. The combination with the feed-roller, means for operating it and the pressure-roller mounted to swing toward and away from the feed-roller, of an extensible and contractible cam for operating the pressure-roller a longer or shorter time to suit different lengths of sheets, substantially as set forth.

3. The combination with the feed mechanism, of a rotary shaft and a cam on said shaft for throwing the feed mechanism into and out of action, the said cam comprising a plurality of sectors and means for adjusting the sectors to increase or diminish the length of active peripheral surface, substantially as set forth.

4. The combination with the cutters and means for operating them, of vibrating arms forming a support for the sheet while being cut and means for throwing the arms away from one another to permit a sheet to drop between them after being cut, substantially as set forth.

5. The combination with the shearing and notching cutters and means for supporting a blank in position to be cut, of a stop for engaging the free end of the blank at different distances from the cutters, means for adjusting the stop and means for feeding the blank different distances into engagement with the stop, substantially as set forth.

6. The combination with the cutters and means for supporting the sheet in position to be cut, of a stop provided with arms of different lengths, means for supporting the stop in swinging adjustment and means for holding the stop in its position with a longer or shorter arm toward the edge of the plate, substantially as set forth.

In testimony that I claim the foregoing as my invention I have signed my name, in presence of two witnesses, this 12th day of September, 1899.

WILLIAM MARTIN.

Witnesses:
 FREDK. HAYNES,
 EDWARD VIESER.